Feb. 3, 1959  J. F. McNAUGHTON ET AL  2,872,254
BEARING ASSEMBLY
Filed March 23, 1955
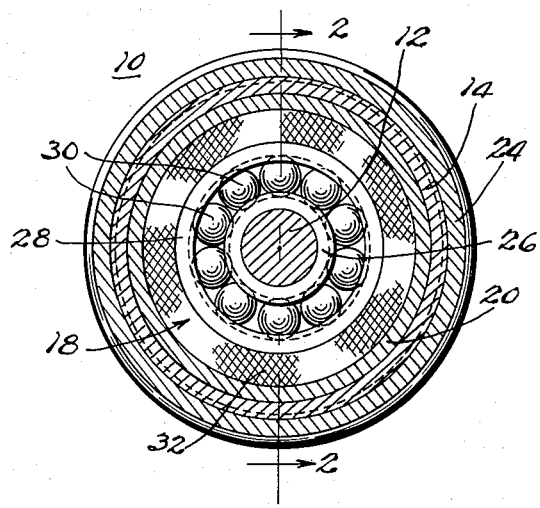
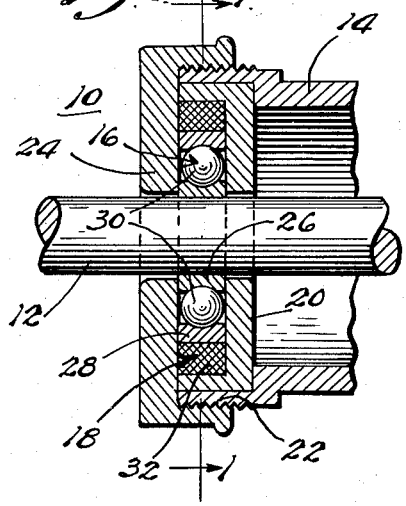
INVENTORS.
John F. McNaughton &
BY Paul Gottfried.
Thiess, Olsen, Mecklenburger
van Holst, & Coltman.

United States Patent Office 2,872,254
Patented Feb. 3, 1959

2,872,254

BEARING ASSEMBLY

John F. McNaughton, Mount Prospect, and Paul Gottfried, Chicago, Ill., assignors, by mesne assignments, to Cook Electric Company, Chicago, Ill., a corporation of Delaware Application March 23, 1955, Serial No. 496,151

8 Claims. (Cl. 308—35)

This invention relates to an improved bearing assembly and more particularly to a bearing assembly especially adapted for use over a wide range of temperatures.

Two basic types of bearings are currently used in mounting rotatable shafts. The first of these is an annular member having a sliding bearing surface such as a brass or graphite bushing and the second is a bearing having rotatable parts such as ball bearings and roller bearings. Many materials, and most metals, exhibit a substantial thermal expansion whereby a bearing constructed of an annular ring assembly having sliding surfaces will generally experience an expansion of the parts and a consequent reduction of the clearance between the sliding parts as a result of either a high ambient temperature or the heat generated by the rotation of the bearing itself. Such expansion produces increased friction, causing the generation of additional heat with bearing rotation causing an increased binding effect and greater heat until the bearing locks against further rotation.

Ball bearings, roller bearings, and the like, on the contrary, exhibit a very low rolling friction and thus a small heating effect. Such bearings are generally packed with an appropriate lubricant and such lubricants become less viscous with increasing temperature. Thus a temperature rise in a ball bearing or the like will produce reduced friction in the bearing, while at normal temperatures the lubricant may be very thick, and the bearing consequently very stiff. Lubricants adapted for use at high temperatures in the range of 250° F. and above will generally be extremely viscous and firm at normal and sub-zero temperatures. A bearing lubricated with such a material may be effectively locked against rotation by the lubricant when the bearing is at sub-zero temperatures. Conversely, if a bearing is constructed with sliding surfaces, as in the conventional brass bearing, a rise in temperature will cause the parts to expand and lock the parts against relative rotation in a bearing having the proper clearance at normal temperatures. Therefore, no single bearing known in the prior art has been adapted for use over a wide temperature range and no satisfactory composite bearing has heretofore been proposed.

It is therefore one important object of this invention to provide an improved composite bearing for use with apparatus experiencing a wide temperature range.

It is another object of this invention to provide an improved bearing assembly for use over a wide range of temperatures in which two bearing sections are cooperatively mounted for relative rotation.

It is still another object of this invention to provide an improved bearing assembly adapted for use over a wide range of temperatures in which the wear on the various parts thereof is greatly reduced and the useful life of the bearing thereby greatly increased.

It is a further object of this invention to provide an improved bearing for use over a wide temperature range, said bearing being highly resistant to shock and vibration.

It is another object of this invention to provide an improved bearing assembly having two bearing sections cooperatively associated in which no clutches, locks or special devices are required for the selective operation of the individual bearing sections.

Further and additional objects of this invention will become manifest from a consideration of this specification, the accompanying drawings, and the appended claims.

Existing bearings and lubricants do not usually allow the operation of electrical equipment over extreme temperature ranges, as lubricants which are useful at high temperatures are too viscous at low temperatures to permit starting with the torque available. It is therefore an object of this invention to provide a dual bearing, allowing the use of two different lubricants, one portion of said bearing to allow rotation at low temperatures and the other to function at high temperatures, either or both being rotatable at intermediate temperatures.

In one form of this invention a dual bearing is provided for use over a wide range of temperatures in which a ball bearing assembly is mounted coaxially with a sliding bearing having a graphite composition annular member. More particularly, the dual bearing includes a ball bearing assembly which is lubricated with a silicone grease having the desired stability and viscosity at high temperatures, but having extreme rigidity at lower temperatures, and a sliding annular member mounted for rotation on the outer race of the ball bearing assembly, the dimensions of the sliding bearing being so selected that an appropriate clearance between the surfaces exists at low temperatures while the parts may bind in rigid engagement at higher temperatures. Rigid engagement is not a requisite for proper operation, however, since the torque relationships and frictional forces are such that the ball bearing will function in its normal manner, in preference to rotating within the surrounding sleeve as a unit, under most conditions.

For a more complete understanding of this invention reference will now be made to the accompanying drawings wherein:

Figure 1 is a transverse sectional view of one embodiment of this invention taken on line 1—1 of Fig. 2; and Fig. 2 is a longitudinal sectional view of the embodiment of Fig. 1 taken on the line 2—2 thereof.

Referring now to the drawing, a high temperature bearing 10 is illustrated in somewhat diagrammatic form connecting a shaft 12 to a housing 14. It should be clear that the particular shaft and housing to which the bearing is connected are only included in the drawing for illustrative purposes and that this bearing would be well adapted for the connection or mounting of any two relatively rotatable members. The particular embodiment shown in the drawings includes two bearing sections. A ball bearing assembly 16 is mounted directly on the shaft 12 and a sliding bearing assembly 18 is mounted for slidable rotation on the ball bearing assembly 16. The entire bearing generally described above is enclosed within a housing which includes a cylindrical shell 20 which is fitted inside of a threaded extension 22 of the housing 14 and a cover portion 24 which threadably engages the threaded portion 22 of the housing 14 and locks the cylindrical bearing shell 20 in position. While the described shell and cover comprise one satisfactory mounting for the bearing portions of this invention it will be clear that the bearings may be mounted in many different ways depending upon the requirements of each individual installation.

The ball bearing assembly 16 includes an inner race 26 which rigidly engages the periphery of shaft 12. An outer race 28 of substantially greater diameter surrounds the inner race 26 and a plurality of substantially spherical balls 30 are disposed between the two races. As shown clearly in Fig. 2, the balls are individually rotatable and freely positioned in recessed portions of the adjacent surfaces of the races 26 and 28. However, in other embodiments it is equally satisfactory to utilize a ball bearing assembly in which a plurality of balls are mounted in spaced relationship about the periphery of the inner race 26 and maintained in the desired spaced relationship by a conventional retainer ring. A lubricant should be provided in the ball bearing assembly 16. This lubricant will effectively coat the surfaces of the balls 30 as well as the outer surface of inner race 26 and the inner surface of outer race 28. As the bearing of this invention is especially adapted for use at high temperatures, the lubricant must be appropriately selected to have the desired viscosity in the high temperature range.

One particular embodiment of this invention was designed for operation in the approximate range between −85° F. and 350° F., and in this embodiment the lubricant employed was Dow-Corning #44 silicone lubricant. This lubricant is substantially rigid in the −50° F. temperature range and therefore the ball bearing portion of this assembly is inoperative in this range. However, at elevated temperatures the lubricant possesses greatly reduced viscosity and functions satisfactorily without flowing away from the surfaces to be lubricated or experiencing chemical breakdown.

To provide low starting friction in the bearing assembly when the apparatus is relatively cool, the sliding bearing portion 18 is provided. This portion includes an annular insert 32 which contacts the outer periphery of outer race 28 and is slidably mounted thereon. An appropriate clearance is provided between the outer race 28 and the self-lubricating insert 32, the clearance in one embodiment being of the order of .002 inch. Upon rotation of the parts, the sliding friction between the outer race 28 and the insert 32 will cause a temperature rise in the assembly. Thus, whether or not the entire apparatus is operating under high temperature conditions the sliding bearing may generate sufficient heat to reduce the viscosity of the ball bearing lubricant and permit the free rotation of the ball bearing portion 16. At the same time the heat generated by the sliding friction will cause the metal parts and especially the outer race 28 to expand reducing the clearance between the outer race 28 and the self-lubricating insert 32. The frictional engagement of these parts is thereby increased and the rotation therebetween may be substantially reduced or completely terminated during the remainder of an operating cycle. In the particular embodiment of this invention described herein the bearing insert 32 is constructed of #39 Graphitar, manufactured by the United States Graphite Company. For use in apparatus operating at high altitudes, in extremely dry air, an altitude-treated graphite such as Graphite Metallizing Corporation Grade 411 silver graphalloy or Stackpole Carbon Company treated graphite grade 51 may be preferred, since untreated graphite tends to deteriorate under such conditions.

In addition to the use of this apparatus over a wide ambient temperature range and under conditions of extreme bearing heating, the dual bearing of this invention may also be useful in apparatus suffering from the development of resinous deposits on the ball bearing portions thereof. For example, in the event that such apparatus has been operated at high temperatures over a long period of time, resinous deposits may accumulate on the various surfaces. Upon cooling, the conventional ball bearing assemblies would be locked by such resinous deposits with such tenacity that extremely high starting torque would be required to commence subsequent operation of the apparatus. If the invention described herein is employed in such assemblies the rotation of the sliding bearing will generally generate sufficient heat to remove the resinous deposits or render the same sufficiently fluid to permit the ball bearing portion to function in the normal manner. Other useful applications of the composite bearing assembly described herein will immediately occur to one skilled in the art and all such uses are believed to come within the spirit and scope of this invention.

Without further elaboration, the foregoing will so fully explain the character of our invention that others may, by applying curent knowledge, readily adapt the same for use under varying conditions of service, while retaining certain features which may properly be said to constitute the essential items of novelty involved, which items are intended to be defined and secured to us by the following claims.

We claim:

1. Bearing apparatus comprising a first annular bearing assembly having inner and outer relatively rotatable peripheral portions and a plurality of antifriction elements therebetween, a lubricant applied to said bearing assembly capable of withstanding temperatures above a given range and having increased viscosity at temperatures below said given range, and annular bearing means having inner and outer peripheral surfaces, one of which is coaxially mounted in engagement with one of said peripheral portions whereby for temperatures lower than said predetermined range said annular bearing means provides rotative movement of the bearing apparatus while at said temperatures above said given range said bearing assembly provides lower friction rotative movement between the inner and outer portions.

2. A bearing apparatus comprising a ball bearing assembly including an inner race, an outer race and a plurality of intermediately disposed spherical members, a lubricant applied to said bearing assembly capable of withstanding temperatures above a given range and having increased viscosity at temperatures below said given range, and annular bearing means coaxially assembled on one of said races, whereby said ball bearing assembly is freely rotatable at temperatures above said given range and said annular bearing means will preferentially provide rotative movement at temperatures below said given range.

3. A bearing apparatus comprising a ball bearing assembly including an inner race, an outer race and a plurality of intermediately disposed spherical members, a lubricant applied to said bearing assembly capable of withstanding temperatures above a given range and having increased viscosity at temperatures below said given range, annular bearing means coaxially assembled on one of said races, and means securing said ball bearing assembly and annular bearing means together in substantially coaxial relationship, whereby said ball bearing assembly is freely rotatable at temperatures above said given range and said annular bearing means will preferentially provide rotative movement below said given range.

4. Bearing apparatus comprising a first annular bearing assembly having inner and outer relatively rotatable peripheral portions and a plurality of antifriction elements therebetween, a lubricant applied to said bearing assembly capable of withstanding temperatures above a given range and having increased viscosity temperatures below said given range, annular bearing means having inner and outer peripheral surfaces, one of which is coaxially mounted in engagement with one of said peripheral portions, and means securing said bearing assembly and bearing means together in substantially coaxial coplanar relationship, whereby for temperatures below said given range said annular bearing means provides rotative movement of the bearing apparatus while at temperatures above said given range said bearing assembly provides low friction rotative movement between the inner and outer portions.

5. Bearing apparatus comprising a shaft, an annular bearing assembly having inner and outer relatively rotatable peripheral portions and a plurality of antifriction elements therebetween, a lubricant applied to said bearing assembly capable of withstanding temperatures above a given range and having increased viscosity at temperatures below said given range, annular bearing means having inner and outer peripheral surfaces, one of which is coaxially mounted in engagement with one of said peripheral portions to form a compound bearing unit, and a relatively rotatable member, said compound bearing unit being secured to said shaft and to said rotatable member whereby said annular bearing means provides relative rotation between said shaft and said rotatable member at temperatures below said given range and the said bearing assembly provides relative preferential rotation between said shaft and said rotatable member at temperatures above said given range.

6. Bearing apparatus comprising a shaft, an annular bearing assembly having inner and outer relatively rotatable peripheral portions and a plurality of antifriction elements therebetween, a lubricant applied to said bearing assembly capable of withstanding temperatures above a given range and having increased viscosity at temperatures below said given range, annular bearing means having inner and outer peripheral surfaces, one of which is coaxially mounted in engagement with one of said peripheral portions to form a compound bearing unit, a relatively rotatable member, and means securing said bearing assembly and bearing means in substantially coaxial coplanar relationship between said shaft and said rotatable member, said compound bearing unit being secured to said shaft and to said rotatable member whereby said annular bearing means provides relative rotation between said shaft and said rotatable member at temperatures below said given range and the said bearing assembly provides relative preferential rotation between said shaft and said rotatable member at temperatures above said given range.

7. Bearing apparatus comprising a shaft, an annular bearing assembly having inner and outer relatively rotatable peripheral portions, said bearing assembly comprising an inner race, an outer race, and a plurality of independently rotatable circular members between said races, a lubricant applied to said bearing assembly capable of withstanding temperatures above a given range and having increased viscosity at temperatures below said given range, annular bearing means having inner and outer peripheral surfaces, one of which is coaxially mounted in engagement with one of said peripheral portions to form a compound bearing unit, a relatively rotatable member, and means securing said bearing assembly and bearing means in substantially coaxial coplanar relationship between said shaft and said rotatable member, said compound bearing unit being secured to said shaft and to said rotatable member whereby said annular bearing means provides relative rotation between said shaft and said rotatable member at temperatures below said given range and the said bearing assembly provides relative preferential rotation between said shaft and said rotatable member at temperatures above said given range.

8. Bearing apparatus comprising a shaft, an annular bearing assembly having inner and outer relatively rotatable peripheral portions, said bearing assembly comprising an inner race, an outer race, and a plurality of independently rotatable circular members between said races, a lubricant applied to said bearing assembly capable of withstanding temperatures above a given range and having increased viscosity at temperatures below said given range, annular self-lubricating graphite bearing means having inner and outer peripheral surfaces, one of which is coaxially mounted in engagement with one of said peripheral portions to form a compound bearing unit, a relatively rotatable member, and means securing said bearing assembly and bearing means in substantially coaxial coplanar relationship between said shaft and said rotatable member, said compound bearing unit being secured to said shaft and to said rotatable member whereby said annular bearing means provides relative rotation between said shaft and said rotatable member at temperatures below said given range and the said bearing assembly provides relative preferential rotation between said shaft and said rotatable member at temperatures above said given range.

References Cited in the file of this patent

UNITED STATES PATENTS

| Number | Name | Date |
|---|---|---|
| 596,310 | Thomas | Dec. 28, 1897 |
| 817,292 | Aman | April 10, 1906 |
| 1,596,090 | Florell | Aug. 17, 1926 |
| 2,054,228 | Oelkers et al. | Sept. 15, 1936 |
| 2,093,800 | May | Sept. 21, 1937 |
| 2,623,353 | Gerard | Dec. 30, 1952 |